Oct. 9, 1928.

B. F. MILLER 1,687,173

DIRIGIBLE SPOTLIGHT

Filed April 14, 1925

INVENTOR.
BOYD F. MILLER
BY
ATTORNEYS.

Patented Oct. 9, 1928.

1,687,173

UNITED STATES PATENT OFFICE.

BOYD F. MILLER, OF PATTON, CALIFORNIA.

DIRIGIBLE SPOTLIGHT.

Application filed April 14, 1925. Serial No. 23,079.

My invention relates to dirigible spotlights for motor vehicles, and the purpose of my invention is the provision of extremely simple, inexpensive and readily applicable means by which a spotlight can be associated with the steering mechanism of a motor vehicle so as to move with any steering movement of the steering wheel to direct and maintain the light rays emanating therefrom on the edge of the road over which the vehicle is traveling so that at night the edge of the road will be at all times visible to the driver of the vehicle.

It is also a purpose of my invention to provide a dirigible spotlight of the above described character which permits both vertical and horizontal adjustment of the spotlight and which operates to rigidly support the spotlight in any adjusted position.

A further purpose of my invention is the provision of a spotlight having mud guards to prevent the splashing of mud or other foreign matter onto the lens of the spotlight and thus preventing the proper and full projection of light rays from the lamp.

I will describe only one form of dirigible spotlight embodying my invention and will then point out the novel features thereof in claim.

In the accompanying drawings.

Figure 3:
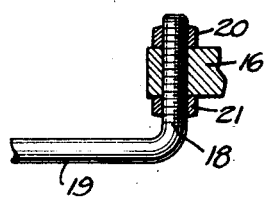
Figure 3 is an enlarged fragmentary view partly in section showing the adjustable connection between the spotlight and the supporting arm.

Referring specifically to the drawings, in which similar reference characters refer to similar parts in each of the views, my invention in its present embodiment comprises a spotlight including a lamp box 15 provided with an ear 16 horizontally disposed so as to receive the vertical portion 18 of an arm 19. The vertical portion 18 is screw threaded, as clearly shown in Figure 3, to receive a pair of nuts 20 and 21, which embrace the opposite sides of the ear 16, securing the latter in vertically adjusted position upon the portion 18 whereby the vertical position of the lamp can be varied as desired. This mounting of the lamp also permits of the desired horizontal adjustment of the spotlight, as it will be clear that the vertical portion, together with the ear, provides a pivotal mounting for the lamp box about which the latter can be swung and secured in any position by tightening of the nuts 20 and 21.

Figure 1:
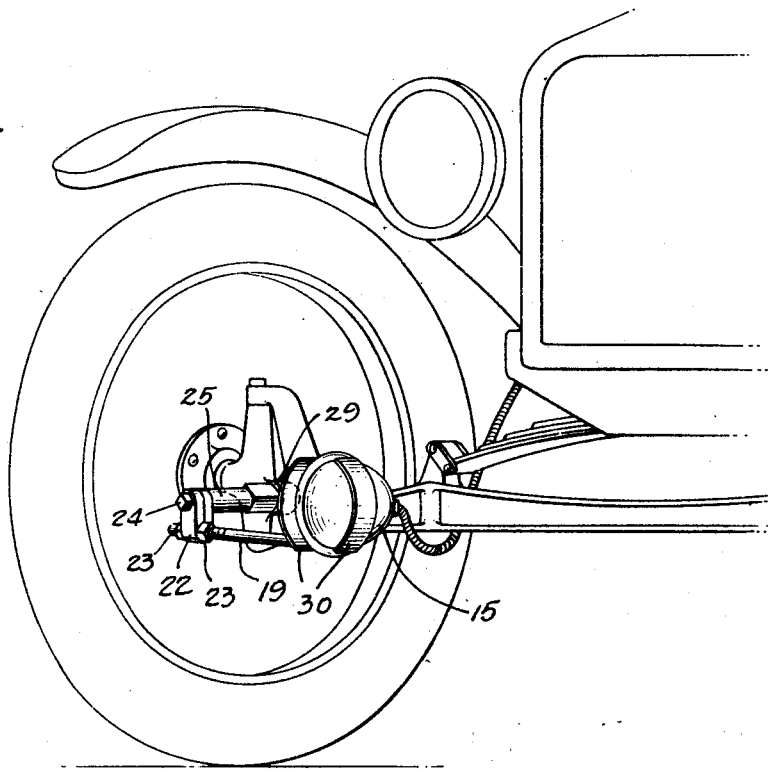
Figure 1 is a view showing in perspective one form of dirigible spotlight embodying my invention in applied position to a motor vehicle.
Figure 2:
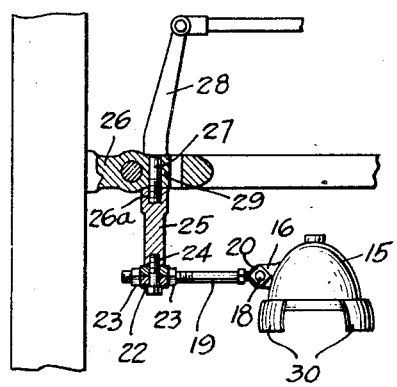
Figure 2 is a top plan view partly in section of the dirigible spotlight in applied position to a motor vehicle.

The arm 19 is adapted to be rigidly held in horizontal position by means of a clamping member 22 which comprises a pair of parallel jaws constructed to accommodate one end of the arm 19 therebetween, the arm being rigidly held in any adjusted position by means of nuts 23 threaded on the arm and embracing the clamp at opposite sides thereof, as clearly illustrated in Figures 1 and 2. A bolt 24 is extended through the jaws of the clamp 22 for securing the latter in clamping position with respect to the arm 19, and this bolt threadedly engages an elongated supporting member 25. The member 25 is in turn adapted to be supported on the steering knuckle 26 of a motor vehicle and to this end one end of the member 25 is formed with a threaded socket 26ª designed to receive the threaded shank 27 of the conventional form of steering knuckle arm 28 which is extended through an ear 29 of the steering knuckle 26.

By means of this mounting it will be clear that the member 25 is rigidly associated with the steering knuckle so as to move with the latter, and in normal operation of the front wheel of a motor vehicle it will be clear that the entire assembly for supporting the spotlight 15 will move with the front wheel, thereby effecting a corresponding movement of the spotlight. By proper adjustment of the mounting of the spotlight it will be manifest that light rays emanating therefrom can be projected to the edge of the road over which the vehicle is traveling, and that as the spotlight moves with any steering movement of the front wheel that the edge of the road in advance of the vehicle will be at all times illuminated.

In order to prevent the lens of the spotlight from being covered with mud and thus interfering with the projection of light rays, I have provided the lamp box 15 with a pair of guards 30 which comprise arcuate plates suitably secured to the lamp box and projecting forwardly from the lens so as to prevent mud splashing onto the latter.

Although I have herein shown and described only one form of dirigible spotlight embodying my invention, it is to be understood that various changes and modifications may be made without departing from the spirit of the invention and the spirit and scope of the appended claim.

I claim as my invention:

A dirigible spotlight for motor vehicles comprising an elongated supporting member having its opposite ends formed with threaded sockets into one of which the threaded shank of a steering arm extending through an ear of a steering knuckle is adapted to be threaded so as to rigidly secure the member to the steering knuckle in a horizontal forwardly extending position, an L shaped arm having relatively long and short respectively horizontal and vertical portions exteriorly threaded at their ends, a clamping member comprising a pair of jaws constructed to receive the threaded end of the horizontal portion of the arm therebetween, nuts threaded on the horizontal portion at opposite sides of the clamp to rigidly secure the arm in a longitudinally adjusted position with respect to the clamp, a bolt extending through the jaws of the clamp and threaded into the other of said sockets of the supporting member so as to secure the clamp to the member and clamp the arm against rotation on the clamp in substantially right angular relation to the member, a lamp box provided with a horizontal ear through which extends the vertical portion of the arm, nuts threaded on the vertical portion at opposite sides of the ear for securing the lamp box in vertically adjusted position on the vertical portion.

BOYD F. MILLER.